L. F. GEORGE.
Animal-Trap.
No. 159,175.            Patented Jan. 26, 1875.
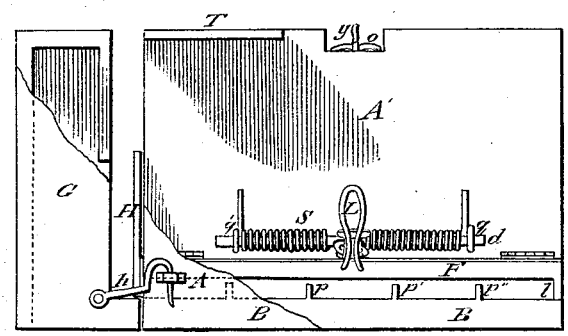
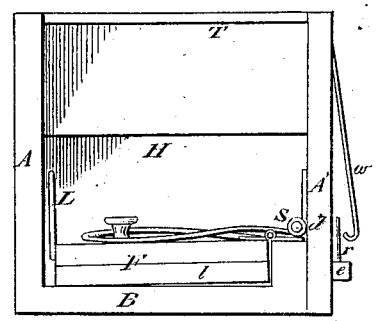
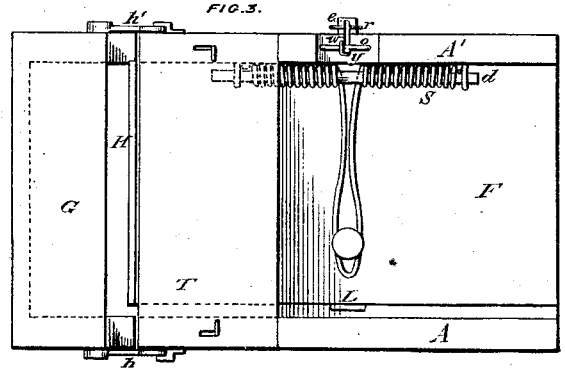
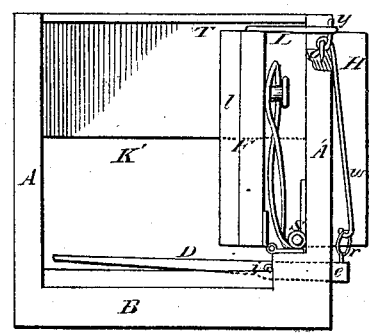
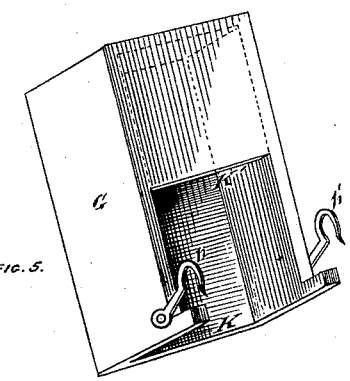
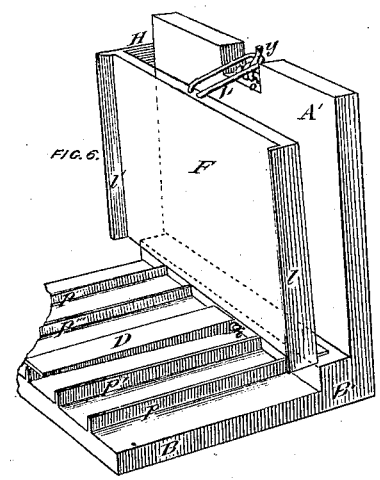

UNITED STATES PATENT OFFICE.

LEVI F. GEORGE, OF SAN FRANCISCO, CALIFORNIA.

IMPROVEMENT IN ANIMAL-TRAPS.

Specification forming part of Letters Patent No. 159,175, dated January 26, 1875; application filed July 31, 1874.

*To all whom it may concern:*

Be it known that I, LEVI F. GEORGE, of the city and county of San Francisco, State of California, have invented an Improvement in Rat and Mouse Traps, of which the following is a specification:

The first part of my invention relates to a rat and mouse trap, consisting essentially of a strip of wood fastened to two other similar pieces, so as to form the bottom and upright sides, respectively, of the apparatus, the bottom piece being provided with a flap, which entirely covers it, and is so arranged on hinges as to be capable, on being drawn back, of being actuated by a powerful spiral spring, which is dependent on the motions of a tilting table or platform connecting with it, in such a manner that, when a rat or mouse moves onto this platform, it immediately disengages this flap, and is caught between it and the bottom strip.

The second part of my invention relates to an adjustable box, open at the bottom, and partly open at one of the sides, so as to serve the double purpose of covering a hole made or being made by a rat or mouse, and to guide it to the trap, in such manner that the rat or mouse is obliged, on going from its hole, to walk over the tilting platform, and be caught.

Figure 1 is a longitudinal elevation of a trap embodying my invention, with the front upright side partly broken away, so as to show the mechanism within. Fig. 2 is an end view of Fig. 1. Fig. 3 is a plan of Fig. 1. Fig. 4 is an end view of Fig. 1, showing the trap set. Fig. 5 is a perspective view of the adjustable box embodying part of my invention. Fig. 6 is a perspective view of part of the trap, shown set.

B B is the bottom strip of wood; and A A', the upright pieces, placed opposite to one another, forming the frame-work of the trap. F is the flap, which is hinged on one side of the bottom piece, B B, so that, when shut down, it entirely covers it, and it is pressed into such position by the action of a powerful spiral spring, S, which is curled round a rod, $d$, fixed to the side A' by staples $g\ g'$.

The bottom piece, B B, is fitted with several partitions, $p\ p'\ p''$, and the flap F is also provided with the same at the ends $l\ l'$, so that, when they are closed together, they will leave sufficient room for a tilting platform, D, and yet secure whatever may enter between them.

The platform D consists of a small strip of wood placed about the center of the bottom piece, B B, and is arranged so as to pivot at $i$ close to the upright A', its shorter arm, $e$, projecting through the side A'. To this portion $e$ of the platform D a ring, $r$, is fixed, so as to be adjusted on the setting of the trap to the long arm of a wire rod, $w$, which pivots at the top of the side A', by being bent round a fixed wire, $o$, so that its shorter arm, $y$, forms a delicate catch for a wire loop, L, attached to the flap F.

The trap is set by pulling open the flap F, adjusting carefully the loop L to the wire catch $y$, and securing the other end of this wire $w$ to the ring $r$, attached to the platform D.

When a small weight, such as a rat or mouse, touches the platform D, the ring $r$ is instantly disengaged from the wire $w$, the catch $y$ from the loop L, and the spring S forcibly closes the flap F onto the bottom board, B B, and crushes the rat or mouse before it has time to escape.

In the event of a hole being made by a rat or mouse in a wall or floor, a partial covering piece or lid, T, is fitted to the trap by means of pins, which swivel, so as to secure it in position, and a box, G, is adjusted to the side of the trap, on which this lid has been fitted by hooks $h\ h'$. This box G is provided with an open bottom, K, and partly-open side K', the open bottom being for the purpose of allowing a rat or mouse to enter from its hole into this box, and the open side for guiding it, as the only road left to the platform on the trap.

The flap F is also provided with a side piece, H, which closes this side opening, so as to prevent the escape of any rats or mice after one has been caught.

I claim as my invention—

1. The combination of the platform D, ring $r$, wire catches $w\ y$, loop L, flap F, and spring S with the bottom strip, B B, provided with partitions $p$ $p'$ $p''$, substantially as and for the purposes herein set forth and specified.

2. The adjustable box G, provided with bottom and side openings K K', respectively, in combination with the trap, fitted with lid T, as herein described, substantially as and for the purposes herein set forth.

LEVI F. GEORGE.

Witnesses:
 ALFRED C. CRANE,
 LIONEL VARICAS.